United States Patent
Andre et al.

(10) Patent No.: US 11,757,686 B2
(45) Date of Patent: Sep. 12, 2023

(54) DEVICE FOR COMPENSATING A FREQUENCY SHIFT

(71) Applicant: STMICROELECTRONICS SA, Montrouge (FR)

(72) Inventors: Eric Andre, Hurtieres (FR); Lionel Vogt, La Rochette (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 17/816,177

(22) Filed: Jul. 29, 2022

(65) Prior Publication Data
US 2023/0034119 A1 Feb. 2, 2023

(30) Foreign Application Priority Data
Jul. 30, 2021 (FR) ...................... 2108297

(51) Int. Cl.
*H04B 7/06* (2006.01)
*H04L 27/10* (2006.01)
*H04L 27/12* (2006.01)
*H04L 27/16* (2006.01)

(52) U.S. Cl.
CPC ............ *H04L 27/106* (2013.01); *H04L 27/12* (2013.01); *H04L 27/16* (2013.01)

(58) Field of Classification Search
CPC ....... H04L 27/106; H04L 27/12; H04L 27/16; H04L 27/2275; H04L 2027/0026; H04L 2027/0053
USPC .......................................................... 375/262
See application file for complete search history.

(56) References Cited

U.S. PATENT DOCUMENTS

| | | |
|---|---|---|
| 6,904,098 B1 | 6/2005 | Isaken et al. |
| 7,751,503 B2 | 7/2010 | Lawrow et al. |
| 8,660,213 B1 * | 2/2014 | Huynh ................. H04B 1/0014 375/322 |
| 2003/0007575 A1 | 1/2003 | Ohishi |
| 2004/0161055 A1 | 8/2004 | Sinha |

(Continued)

OTHER PUBLICATIONS

Kuang, L., et al., "A Fully Integrated 60-GHz 5-Gb/s QPSK Transceiver With T/R Switch in 65-nm CMOS," IEEE Transactions on Microwave Theory and Techniques, vol. 62, No. 12, Dec. 2014, 15 pages.

*Primary Examiner* — Tanmay K Shah
(74) *Attorney, Agent, or Firm* — Slater Matsil, LLP

(57) ABSTRACT

In an embodiment a device includes a first circuit and a second circuit, wherein the first circuit is configured to generate a fourth signal and a fifth signal by applying the phase shift respectively to a first signal and to a second signal and deliver a sixth signal corresponding to a sampling over one bit of the fourth signal, a seventh signal corresponding to a sampling over one bit of the fifth signal, an eighth signal corresponding to a sampling over one bit of a difference between the fourth and fifth signals, and a ninth signal corresponding to a sampling over one bit of a sum between the fourth and fifth signals, wherein the second circuit is configured to receive the sixth, seventh, eighth, and ninth signals and determine, during a first phase where the first and second signals are representative of a first known symbol of a QPSK constellation, a state of a first bit from among a first state and a second state based on the eighth and ninth signals.

20 Claims, 6 Drawing Sheets

(56) References Cited

U.S. PATENT DOCUMENTS

| | | | |
|---|---|---|---|
| 2005/0036571 A1* | 2/2005 | Shvodian | H04L 27/0004 375/E1.001 |
| 2007/0190961 A1* | 8/2007 | Igarashi | H04B 1/30 455/252.1 |
| 2018/0267144 A1* | 9/2018 | Lin | G01S 7/42 |

* cited by examiner

DEVICE FOR COMPENSATING A FREQUENCY SHIFT

CROSS-REFERENCE TO RELATED APPLICATIONS

This application claims the benefit of French Application No. 2108297, filed on Jul. 30, 2021, which application is hereby incorporated herein by reference.

TECHNICAL FIELD

The present disclosure generally concerns electronic circuits and, more specifically, electronic circuits for the compensation of a frequency shift.

BACKGROUND

Circuits for receiving a QPSK ("Quad Phase Shift Keying") modulated signal are known. These circuits are configured to receive a signal RFin at a carrier frequency Fc having its phase modulated by a signal I(t) ("In Phase") and a signal Q(t) ("In Quadrature"), signals I(t) and Q(t) being binary signals and the pair of values I(t) and Q(t) defining a symbol periodically updated at a frequency Fs, called data frequency.

To demodulate the received signal RFin, these reception circuits comprise a local oscillator delivering a frequency FLO. For the demodulation to be correctly performed, that is, with no error, it is desirable for frequency FLO to be equal to frequency Fc. Indeed, when frequency FLO is different from frequency Fe, this may result in demodulation errors. As an example, the higher the value of frequency Fe, for example greater than 10 GHz as is particularly the case in the V-band, the more a given difference between frequency Fc and frequency FLO is likely to result in demodulation errors.

For frequency FLO to be equal to frequency Fe, it is known to generate, in the receive circuit, frequency FLO from a quartz. However, the use of a quartz increases the cost of the receive circuit, which is not desirable. Further, a quartz does not have an infinite accuracy, and the use of a quartz to generate frequency FLO does not guarantee for frequency FLO to be exactly equal to frequency Fc.

To avoid the use of a quartz, a circuit for compensating for the frequency shift between frequency Fc and frequency FLO may be provided in the receive circuit. Known frequency shift compensation circuits however suffer from various disadvantages. For example, these circuits are complex to implement, are not adapted to operating at the high frequencies indicated hereabove as an example, and/or are electric power intensive.

SUMMARY

Embodiments provide a frequency shift compensation circuit, or device and a method for compensating a frequency shift.

Embodiments provide a frequency shift compensation circuit, or device, which overcomes all or part of the disadvantages of known frequency shift compensation circuits, for example for an implementation in a QPSK demodulation circuit.

For example, an embodiment provides a frequency shift compensation device enabling, on implementation thereof in a QPSK modulation circuit, to demodulate the data despite a maximum shift between frequency Fc and frequency FLO greater than 1,000 ppm (parts per million). As an example, the device allows an operation with a data flow ranging up to 10 Gbps and a power consumption smaller than 10 pJ per bit. As an example, for a frequency Fe equal to 60 GHz, a frequency shift of 1,000 ppm corresponds to a shift between frequency Fe and frequency FLO equal to 60 MHz.

An embodiment provides a device comprising a first circuit, a second circuit, and a third circuit. The first circuit is configured to receive a first signal, a second signal, and a third signal, the third signal being representative of a phase shift, to generate a fourth signal and a fifth signal by application of said phase shift respectively to the first signal and to the second signal, and to deliver a sixth signal corresponding to a sampling over one bit of the fourth signal, a seventh signal corresponding to a sampling over one bit of the fifth signal, an eighth signal corresponding to a sampling over one bit of the difference between the fourth and fifth signals, and a ninth signal corresponding to a sampling over one bit of the sum between the fourth and fifth signals. The second circuit is configured to receive the sixth, seventh, eighth, and ninth signals, to determine, during a first phase where the first and second signals are representative of a first known symbol of a QPSK constellation, a state of a first bit from among a first state and a second state based on the eighth and ninth signals, to deliver a digital signal corresponding to a multiplication of the first bit by a gain; and to periodically decrease, during said first phase, said gain down to a unit value. The third circuit is configured to determine the third signal based on said digital signal.

According to an embodiment, the second circuit comprises a fourth circuit configured to, during the first phase, set the first bit to the first state when, on the QPSK constellation, a position corresponding to the fourth and fifth signals is shifted in a first direction with respect to the first symbol, and set the first bit to the second state when, on the QPSK constellation, the position is shifted in a second direction with respect to the first symbol.

According to an embodiment, the fourth circuit is configured to determine the shifting direction based on the eighth and ninth signals, preferably based on the eighth and ninth signals only.

According to an embodiment, the fourth circuit is a two-state state machine, configured to be rated at the frequency of the sampling of the sum and of the difference of the fourth and fifth signals.

According to an embodiment, the third circuit comprises a first digital filter, preferably proportional-integral, followed by a second digital filter, preferably integrating, the first filter being configured to receive said digital signal, the second filter being configured to receive an output signal of the first filter and to deliver the third signal.

According to an embodiment, the first and second filters are configured to be rated at the frequency of the sampling of the sum and of the difference of the fourth and fifth signals.

According to an embodiment, the device further comprises an oscillator configured to deliver a tenth signal and an eleventh signal at a first frequency determined by a control signal, the eleventh signal being phase-shifted by 90° with respect to the tenth signal, and a control circuit configured to deliver said control signal.

According to an embodiment, during the first operating phase, the control circuit is configured, at least when the gain reaches for a first time the unit value, to determine a difference between the first frequency and a second frequency, preferably based on a signal delivered by the third circuit, to compare the determined difference with a threshold, to update the control signal and control a resetting of the gain to a maximum value when said comparison indicates that the difference is greater than said threshold, and to hold the control signal at its current value and control the holding of the gain at the unit value when said comparison indicates that the difference is smaller than said threshold.

According to an embodiment, the device further comprises a first frequency mixer configured to receive the tenth signal and a QPSK-modulated radio frequency signal and a second frequency mixer configured to receive the eleventh signal and the QPSK-modulated radio frequency signal, the first mixer being configured to deliver the first signal and the second mixer being configured to deliver the second signal.

According to an embodiment, the first circuit is configured to sample the fourth and fifth signals, the sum of the fourth and fifth signals, and the difference of the fourth and fifth signals at a frequency smaller than a data frequency of the QPSK-modulated radio frequency signal.

According to an embodiment, during a second operating phase, the second circuit is configured to determine the state of the first bit based on the sixth, seventh, eighth, and ninth signals.

According to an embodiment, the second circuit comprises a circuit configured to determine a passage from the first operating phase to the second operating phase.

According to an embodiment, the second circuit comprises a fifth circuit configured to, during the second phase, estimate which of the four symbols in the constellation the first and second signals correspond to, based on the sixth and seventh signals, set the first bit to the first state when, on the constellation, a position corresponding to the fourth and fifth signals is shifted in a first direction with respect to the estimated symbol, and set the first bit to the second state when, on the constellation, said position is shifted in a second direction with respect to the estimated symbol.

According to an embodiment, the fifth circuit is configured to determine the shifting direction based on the eighth and ninth signals.

An embodiment provides a QPSK demodulator comprising a device such as described hereabove.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, certain conventional elements of the QPSK demodulators have not been detailed, such as for example frequency mixer circuits and clock data recovery (CDR) circuits, the described embodiments being compatible with these conventional elements.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
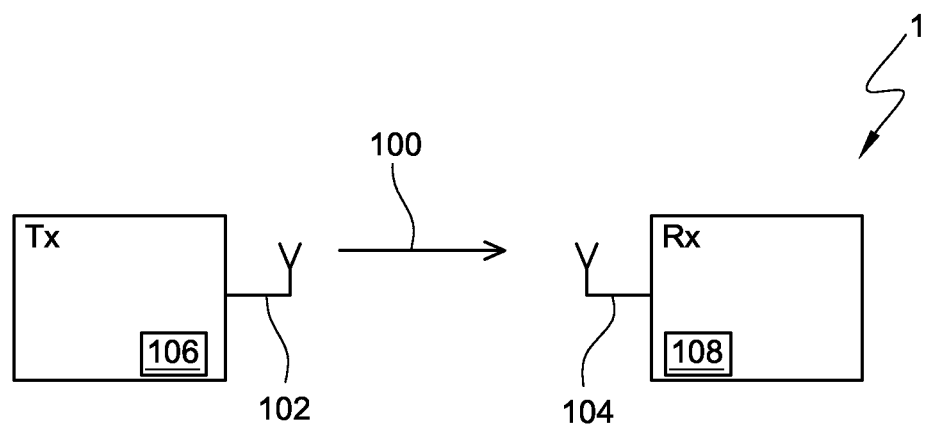
FIG. 1 very schematically shows in the form of blocks an example of a wireless transmission system of the type to which the described embodiments apply.

FIG. 1 very schematically shows, in the form of blocks, an example of a wireless transmission system 1 of the type to which the described embodiments apply.

System 1 comprises a transmitter Tx of a wireless signal 100, and a receiver Rx of signal 100. More particularly, transmitter Tx comprises an antenna 102 for the transmission of signal 100, and receiver Rx comprises an antenna 104 for the reception of signal 100.

The transmitter comprises a local oscillator 106 configured to deliver a signal at a frequency Fc, called carrier frequency.

In system 1, the data transmission between transmitter Tx and receiver Rx is performed due to a QPSK modulation of signal 100.

Thus, although this is not detailed in FIG. 1, transmitter Tx receives data bits to be transmitted in the form of two binary signals I(t) and Q(t). The state of signals I(t) and Q(t) is updated at a frequency Fs, called data frequency. Thus, at each period Ts corresponding to frequency Fs, signals I(t) and Q(t) form a pair of bits each having a constant binary state over the entire period Ts, the pair of bits corresponding to one of the four symbols of a QPSK constellation, or QPSK constellation diagram. Signal I(t) is multiplied by a cosine at frequency Fe, signal Q(t) is multiplied by a sine at frequency Fe, and the two signals thus obtained are added to each other to generate signal 100. Signal 100 is then equal to I(t).cos(w.t)+Q(t).sin(w.t), with w equal to 2.Π.Fc.

On the side of receiver Rx, signal 100 is demodulated to recover signals I(t) and Q(t). For this purpose, the receiver comprises a local oscillator 108 at frequency FLO. Signal 100 is multiplied by a cosine at frequency FLO on a first path and by a sine at frequency FLO on a second path, and then, on each path, the signal obtained after multiplication is filtered to suppress unwanted frequencies. One then obtains a first signal I1(*t*) at the output of the first path, and a signal Q1(*t*) at the output of the second path. These two signals I1(*t*) and Q1(*t*) are sampled at data frequency Fs to obtain the transmitted bits. In particular, receiver Rx comprises a clock data recovery, or CDR, circuit (not shown) enabling to obtain data frequency Fs. However, when frequency FLO is not equal to frequency Fe, which occurs in practice, signal I1(*t*) is proportional to I(t).cos(phi.t)–Q(t).sin(phi.t) and signal Q1(*t*) is proportional to Q(t).cos(phi.t)+I(t).sin(phi.t), with phi equal to 2.Π.deltaF, and deltaF equal to the difference between frequencies FLO and Fc.

This difference deltaF, which may be greater than 1,000 ppm, raises an issue for the demodulation. Indeed, difference deltaF causes a rotation of the symbols of the QPSK constellation. It is desirable to compensate for this difference deltaF.

It is here provided to use a preamble at the beginning of a communication between transmitter Tx and receiver Rx, corresponding to the sending, by transmitter Tx to receiver Rx, of a QPSK symbol S1 previously known by receiver Rx. During the transmission of the preamble, due to the fact that the sent symbol S1 is known and constant, according to an embodiment, receiver Rx carries out at least one phase of coarse compensation of shift deltaF.

According to an embodiment, each phase of coarse shift compensation corresponds to the application of a controllable phase shift to signals I1(*t*) and Q1(*t*) to obtain two signals I2(*t*) and Q2(*t*) where the influence of the difference between frequencies Fc and FLO has been coarsely compensated for.

According to an embodiment, the variable phase shift is determined or controlled based on a direction of the shift of the position, on the QPSK constellation, of a symbol corresponding to signals I2(*t*) and Q2(*t*) sampled over one bit, for example, at a frequency Fcwr smaller than data frequency Fs, with respect to the known symbol sent during the preamble.

According to an embodiment, during each coarse compensation phase, the shifting direction is estimated based on a sampling over one bit of the sum of signals I2(*t*) and Q2(*t*) and based on a sampling over one bit of the difference of signals I2(*t*) and Q2(*t*), for example, at frequency Fcwr.

According to an embodiment, when the frequency difference determined at the end of a first coarse compensation phase is greater than a threshold TH, for example, a threshold TH equal to one or several tens of MHz, the frequency FLO of the local oscillator is adjusted based on this determined frequency difference, and a new coarse compensation phase is implemented, to take into account the new value of frequency FLO, that is, to take into account the adjusted value of frequency FLO.

According to an embodiment, once the transmission of the preamble is over, the frequency difference is compensated for continuously and more finely than during the coarse compensation phase(s).

The provision of the above-described preamble avoids using, during each phase of coarse compensation of the shift, a very accurate data frequency on the receiver side. In particular, according to an embodiment, during each coarse compensation phase, the sampling is performed at frequency Fcwr smaller than data frequency Fs, which enables to decrease the power consumption.

The provision of the preamble and of at least one implementation of the coarse compensation phase further enables to compensate for significant shifts between frequencies FLO and Fc that cannot be corrected or compensated for by usual frequency shift correction devices. For example, part of the shift between frequencies Fc and FLO is corrected at least at the end of a first implementation of the coarse shift compensation phase, by adjusting the value of frequency FLO.

Figure 2:
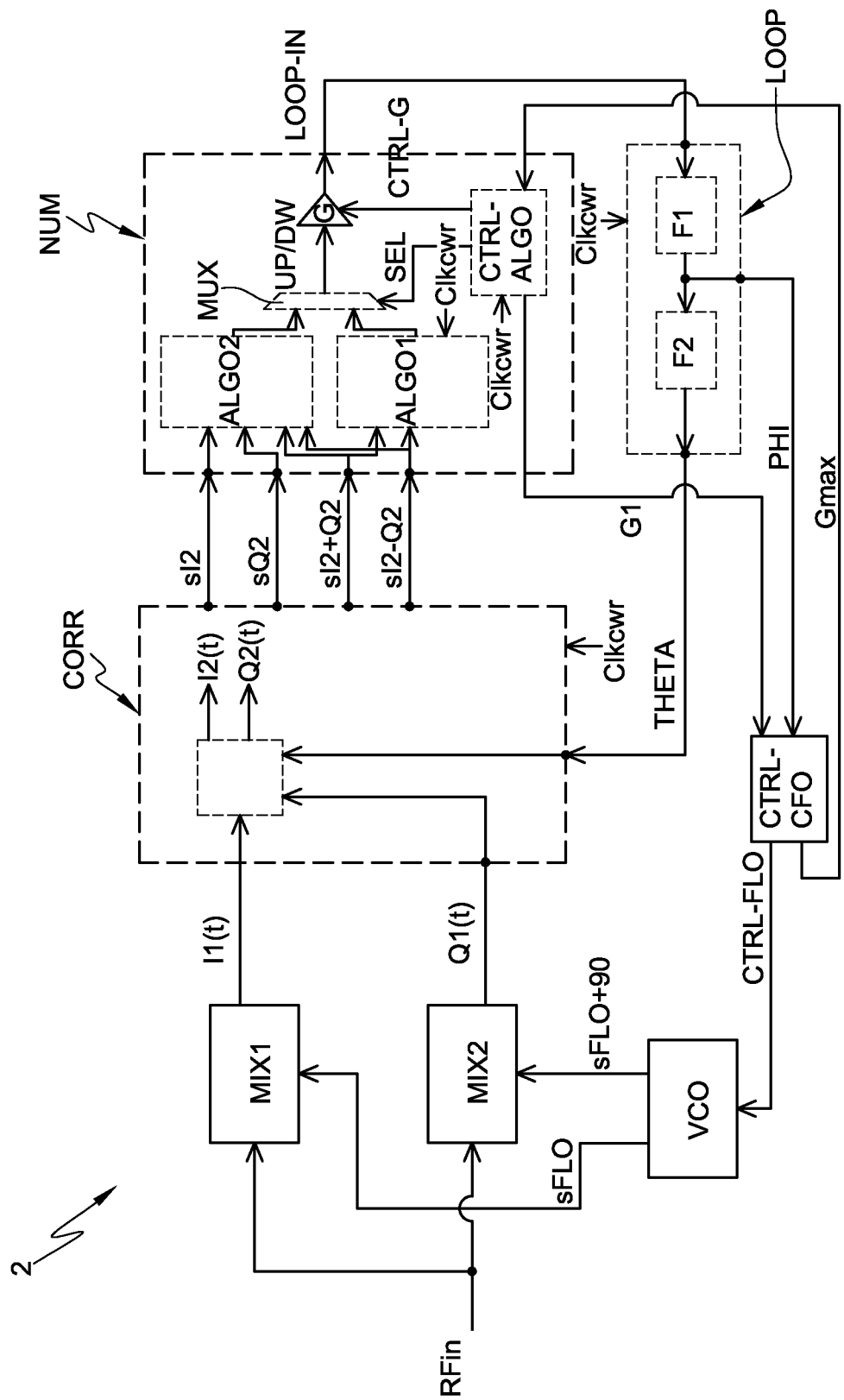
FIG. 2 schematically shows a device for correcting a frequency shift according to an embodiment.

FIG. 2 schematically shows in the form of blocks an embodiment of a device 2 for the compensation of a frequency shift. Device 2 is for example implemented in a QPSK demodulator of a receiver of the type of that described in relation with FIG. 1.

Device 2 comprises a circuit CORR, a circuit NUM, and a circuit LOOP.

Circuit CORR is configured to receive signal I1(*t*) and signal Q1(*t*). As previously indicated, signal I1(*t*) is usually obtained by multiplying a QPSK-modulated radio frequency signal, RFin, with a cosine at the frequency FLO of a local oscillator, bearing reference VCO in FIG. 2, and by filtering unwanted frequencies in the signal resulting from this multiplication, signal Q1(*t*) being usually obtained by multiplying signal RFin with a sine at frequency FLO and by filtering, in the signal resulting from the multiplication, unwanted frequencies. For this purpose, oscillator VCO delivers a signal sFLO at frequency FLO and a signal sFLO+90 at frequency FLO and phase-shifted by 90° with respect to signal sFLO. In FIG. 2, the obtaining of signal I1(*t*) is implemented by a frequency mixer MIX1 receiving signal RFin and signal sFLO and delivering signal I1(*t*). Similarly, in FIG. 2, the obtaining of signal Q1(*t*) is implemented by a frequency mixer MIX2 receiving signal RFin and signal sFLO+90 and delivering signal Q1(*t*).

Circuit CORR is further configured to receive a signal THETA representative of a phase shift θ to be applied to signals I1(*t*) and Q1(*t*). More particularly, circuit CORR is configured to generate signal I2(*t*) and signal Q2(*t*). For example, signal I2(*t*) is proportional to I(t).cos(phi.t-θ)–Q(t).sin(phi.t-θ) and signal Q2(*t*) is proportional to Q(t).cos(phi.t-θ)+I(t).sin(phi.t-θ). In other words, circuit CORR is configured to implement a phase rotation, or shift, by a quantity θ on signals I1(*t*) and Q1(*t*), to obtain respective signals I2(*t*) and Q2(*t*). This function of circuit CORR is preferably entirely analogically implemented. Phase shift θ aims at the compensation of the difference between frequencies Fc and FLO.

Circuit CORR is further configured to deliver four signals sI2, sQ2, sI2+Q2, and sI2-Q2. These four signals are binary signals, that is, signals over one bit each. Signal sI2 corresponds to the sampling over one bit of signal I2(*t*), signal sQ2 corresponds to the sampling over one bit of signal Q2(*t*), signal sI2+Q2 corresponds to the sampling over one bit of the sum of signals I2(*t*) and Q2(*t*), and signal sI2-Q2 corresponds to the sampling over one bit of the difference between signals I2(*t*) and Q2(*t*). In other words, the binary state of signal sI2 is representative of the sign, or polarity, of signal I2(*t*) at the time of the sampling, the binary state of signal sQ2 is representative of the sign of signal Q2(*t*) at the time of the sampling, the binary state of signal sI2+Q2 is representative of the sign of the sum of signals I2(*t*) and Q2(*t*) at the time of the sampling.

According to an embodiment, signals sI2, sQ2, sI2+Q2, and sI2-Q2 correspond to a sampling implemented at frequency Fcwr, which is smaller than data frequency Fs. Circuit CORR then receives a clock signal Clkcwr at frequency Fcwr. As an example, frequency Fcwr is obtained by integer division of frequency Fs. Preferably, frequency Fs is supplied by a clock data recovery circuit, not shown in FIG. 2. As an example, this clock data recovery circuit receives signals I2(t) and Q2(t), samples them at frequency Fs, and processes the obtained samples to control frequency Fs. Clock data recovery circuits are well known by those skilled in the art, which are capable of implementing such a circuit in device 2.

Circuit NUM is configured to receive signals sI2, sQ2, sI2+Q2, and sI2−Q2. Circuit NUM is further configured to generate a signal UP/DW over one bit. Circuit NUM is further configured to deliver a signal LOOP-IN corresponding to the multiplication of bit UP/DW by a gain G. Signal LOOP-IN is for example a digital signal over a plurality of bits. Preferably, circuit NUM is a digital circuit.

Circuit LOOP is configured to determine signal THETA, and thus phase shift θ, based on signal LOOP-IN. For example, circuit LOOP is configured to receive signal LOOP-IN, and has an output configured to deliver signal THETA. Preferably, signal THETA is a digital signal over a plurality of bits. Preferable, circuit LOOP is a digital circuit. Circuit LOOP forms, for example, a digital filter, preferably a digital correction filter. Preferably, circuit LOOP is rated at frequency Fcwr and then receives signal Clkcwr.

More particularly, during a first operating phase during which signals I1(t) and Q1(t) are representative of the known symbol S1 of the QPSK constellation, that is, during the preamble corresponding to the transmission of symbol S1, circuit NUM is configured to determine the binary state of bit UP/DW based on signals sI2+Q2 and sI2−Q2, preferably based on signals sI2+Q2 and sI2−Q2 only. According to an embodiment, circuit NUM comprises a circuit ALGO1 configured, during a first operating phase, to determine the state of bit UP/DW based on signals sI2+Q2 and sI2−Q2, preferably based on signals sI2+Q2 and sI2−Q2 only. Preferably, circuit ALGO1 is a two-state state machine. Preferably, circuit or state machine ALGO1 is rated at frequency Fcwr and then receives signal Clkcwr.

Figure 3:
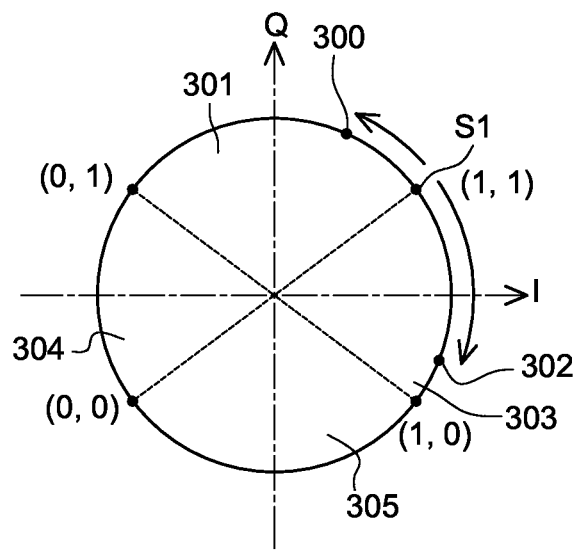
FIG. 3 shows a QPSK constellation diagram and illustrates an implementation mode of an algorithm.

FIG. 3 illustrates an embodiment of the determination, during the first operating phase, of the state of bit UP/DW based on signals sI2+Q2 and sI2−Q2, for example implemented by the circuit ALGO1 of circuit NUM.

More particularly, FIG. 3 represents a QPSK constellation, that is, a constellation diagram having the four symbols of a QPSK modulation arranged thereon. As well known by those skilled in the art, these four symbols correspond to the four possible pairs of values (I(t),Q(t)), that is, (0,0), (1,0), (0,1), and (1,1).

In this example, it is considered that the symbol S1 of the preamble corresponds to the pair of values (1, 1), signals I1(t) and Q1(t) then being, on reception of the preamble, representative of this known symbol S1.

In this embodiment, bit UP/DW is set to a first binary state, for example, '1' when, on the QSPK constellation, a position corresponding to signals Q2(t) and I2(t) is shifted in a first direction, for example, counterclockwise, with respect to symbol S1, and is set to a second binary state, for example '0', when this position is shifted in a second direction, for example, clockwise, with respect to symbol S1. The expression "position corresponding to signals Q2(t) and I2(t)" signifies, for example, the position corresponding to signals Q2(t) and I2(t) at a time of sampling at frequency Fcwr.

According to an embodiment, the direction of the shift of the position corresponding to signals I2(t) and Q2(t) with respect to symbol S1 is determined by means of signals sI2+Q2 and sI2−Q2 only. This enables to avoid sampling over a plurality of bits signals I2(t) and Q2(t) to accurately determine position 300, further knowing that the accurate determination of position 300 would then require a complex, bulky, and power-intensive digital processing circuit.

According to an example illustrated in FIG. 3, at a time of sampling at frequency Fcwr to obtain signals sI2, sQ2, sI2+Q2, and sI2−Q2, signals I2(t) and Q2(t) correspond to a position 300 on the QPSK constellation. Thus, signal sI2+Q2 is in a binary state, for example '1', indicating that the sum of signals I2(t) and Q2(t) is positive, and signal sI2−Q2 is in a binary state, for example '0', indicating that the difference of signals I2(t) and Q2(t) is negative. Thus, even without exactly knowing the location of position 300 with respect to symbol S1, signals sI2+Q2 and sI2−Q2 enable to know that position 300 is located in an area 301 (delimited in dotted lines in FIG. 3), and thus that position 300 is shifted counterclockwise with respect to symbol S1. In this example, bit UP/DW is set to its first binary state, for example, '1'.

According to another example illustrated in FIG. 3, at a time of sampling at frequency Fcwr to obtain signals sI2, sQ2, sI2+Q2, and sI2−Q2, signals I2(t) and Q2(t) correspond to a position 302 on the QPSK constellation. Thus, signal sI2+Q2 is in a binary state, for example '1', indicating that the sum of signals I2(t) and Q2(t) is positive, and signal sI2−Q2 is in a binary state, for example '1', indicating that the difference of signals I2(t) and Q2(t) is positive. Signals sI2+Q2 and sI2−Q2 enable to determine that position 302 is in an area 303 (delimited in dotted lines in FIG. 3), and thus that position 302 is shifted clockwise with respect to symbol S1. In this example, bit UP/DW is set to its second binary state, for example, '0'.

Signal UP/DW thus enables to determine whether the phase shift θ applied to signals I1(t) and Q1(t) should be decreased or increased, to bring the position corresponding to signals I2(t) and Q2(t) closer to symbol S1, that is, to compensate for the shift between frequencies Fe and FLO.

More generally, signals sI2+Q2 and sI2−Q2 enables to determine which of areas 301, 303, 304 (delimited in dotted lines in FIG. 3) and 305 (delimited in dotted lines in FIG. 3) the position corresponding to signals I2(t) and Q2(t) at the time of the sampling having resulted in these signals sI2+Q2 and sI2−Q2 belongs to, and thus the direction of the shift (clockwise or counterclockwise) of this position with respect to symbol S1, and thus the corresponding state of bit UP/DW.

It will be within the abilities of those skilled in the art to deduce, based on the two examples described hereabove in relation with FIG. 3, how to determine the state of bit UP/DW based on signals sI2+Q2 and sI2−Q2 in cases where symbol S1 is different from the pair of values (1,1).

Figure 4:
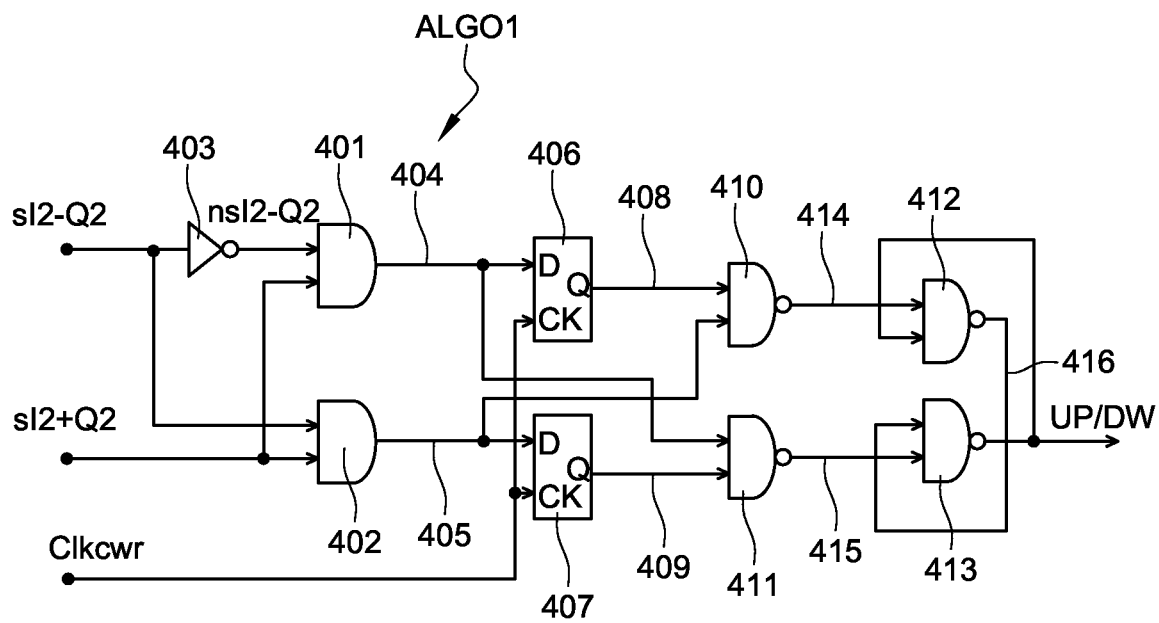
FIG. 4 shows an example of implementation of a circuit for the execution of the algorithm described in relation with FIG. 3.

FIG. 4 illustrates an example of implementation of circuit ALGO1.

In this example of embodiment, circuit ALGO1 comprises two AND gates 401 and 402.

Gate 401 comprises an input configured to receive signal sI2+Q2 and an input configured to receive a signal nsI2−Q2 complementary to signal sI2−Q2. Signal nsI2−Q2 is in binary state '1', respectively '0', when signal sI2−Q2 is in binary state '0', respectively '1'. As an example, signal nsI2−Q2 is available at the output of an inverter 403 receiving signal sI2−Q2. Gate 401 delivers an output signal 404 corresponding to the logic AND between the two signals that it receives.

Gate 402 comprises an input configured to receive signal sI2+Q2 and an input configured to receive a signal sI2−Q2. Gate 402 delivers an output signal 405 corresponding to the logic AND between the two signals that it receives.

The two NAND gates 401 and 402 and inverter 403 form a first circuit configured to deliver, based on signals sI2+Q2 and sI2–Q2, signals 404 and 405 indicating whether the position corresponding to signals I2(t) and Q2(t) is located in the quarter of the constellation immediately shifted clockwise with respect to symbol S1, that is, in this example, in area 303 of FIG. 3 when signal 404 is at '0' and signal 405 at '1', or whether the position corresponding to signals I2(t) and Q2(t) is in the quarter of the constellation immediately shifted counterclockwise with respect to symbol S1, that is, in this example, in area 301 of FIG. 3 when signal 404 is '1' and signal 405 at '0'.

The implementation of this first circuit in cases where symbol S1 is different from the (1, 1) pair, and/or with other combinational gates than those described hereabove is within the abilities of those skilled in the art.

In this example of embodiment, circuit ALGO1 comprises two synchronous storage elements 406 and 407. Elements 406 and 407 are configured to be rated at frequency Fcwr and thus each receive signal Clkcwr on a synchronization input CK. Element 406, respectively 407, comprises a data input D configured to receive signal 404, respectively 405. Element 406, respectively 407, is configured to store the binary state of its data input D on each active edge, for example, rising, of signal Clkcwr, and to deliver a signal 408, respectively 409, corresponding to the stored binary state. Signal 408, respectively 409 is available on a Q output of element 406, respectively 407. Preferably, elements 406 and 407 are D flip-flops.

In this example of embodiment, circuit ALGO1 further comprises four NAND gates 410, 411, 412, and 413.

Gate 410 comprises an input configured to receive signal 408 and an input configured to receive signal 405. Gate 410 delivers an output signal 414 corresponding to the complementary of the logic AND between the two signals that it receives.

Gate 411 comprises an input configured to receive signal 409 and an input configured to receive signal 404. Gate 410 delivers an output signal 415 corresponding to the complementary of the logic AND between the two signals that it receives.

The two gates 406 and 407 and the two gates 410 and 411 form a second circuit delivering signals 414 and 415 indicating the result of the comparison of the position corresponding to signals I2(t) and Q2(t) at a current sampling time with the position corresponding to signals I2(t) and Q2(t) at the previous sampling time. More particularly, gates 406 and 407 deliver on their Q outputs signals 408 and 409 which correspond to signal 404 and 405 at the previous sampling time, and thus to the position corresponding to signals I2(t) and Q2(t) at this previous sampling time. The signals 414 and 415 delivered by gates 410 and 412 indicate whether the position corresponding to signals I2(t) and Q2(t) has transited or not through symbol S1 between the two successive sampling times and, if such is the case, in which direction (clockwise or counterclockwise).

In other words, this second circuit is configured to deliver, based on the output signals of the first circuit, signals 414 and 415 indicating whether, between the two successive sampling times, the position corresponding to signals I2(t) and Q2(t) has been shifted clockwise, transiting through symbol S1 (signal 414 at '0' and signal 415 at '1' in this example), counterclockwise, transiting through symbol S1 (signal 414 at '1' and signal 415 at '0' in this example) or whether the position corresponding to signals I2(t) and Q2(t) has not transited through symbol S1 between these two sampling times (signals 414 and 415 at '1' in this example).

The implementation of this second circuit in cases where symbol S1 is different from the (1, 1) pair and/or with other logic gates than those described hereabove is within the abilities of those skilled in the art.

Gate 412 comprises an input configured to receive signal 414 and an input configured to receive bit UP/DW. Gate 412 delivers an output signal 416 corresponding to the complementary of the logic AND between the two signals that it receives.

Gate 413 comprises an input configured to receive signal 415 and an input configured to receive signal 416. Gate 413 delivers bit UP/DW, which corresponds to the complementary of the logic AND between the two signals that it receives.

Gates 412 and 413 form a third circuit, or memory cell, configured to update the state of bit UP/DW based on the signals 414 and 415 delivered by the second circuit. For example, the third circuit sets bit UP/DW to a first state (in this example, to '1') when the position corresponding to signals I2(t) and Q2(t) has transited through symbol S1, clockwise, between the two successive sampling times (signal 414 at '0' and signal 415 at '1' in this example), to a second state (in this example at '0') when the position corresponding to signals I2(t) and Q2(t) has transited through symbol S1, counterclockwise, between the two successive sampling times (signal 414 at '1' and signal 415 at '0' in this example), or holds the constant state of bit UP/DW when the position corresponding to signals I2(t) and Q2(t) has not transited through symbol S1 between the two successive sampling times (signals 414 and 415 at '1' in this example).

The implementation of this third circuit in cases where the symbol is different from the (1, 1) pair and/or with other combinational gates than those described hereabove is within the abilities of those skilled in the art.

More generally, it will be within the abilities of those skilled in the art, based on the functional description made in relation with FIG. 3, to provide other implementations of circuit ALGO1 than that described in relation with FIG. 4.

Referring again to FIG. 2, according to an embodiment, during the first operating phase, that is, when signals I1(t) and Q1(t) are representative of preamble symbol S1, circuit NUM is configured to decrease, from a maximum value, gain G periodically until gain G reaches a unit value, for example, by periodically dividing gain G. The frequency at which gain G is decreased is preferably smaller than frequency Fcwr, for example, 32 times smaller.

This progressive decrease of gain G enables to increase the convergence speed of the system, or of the loop, comprising circuits CORR, NUM, and LOOP, as compared with the case where gain G would always be at the unit value. Further, this progressive decrease of gain G allows a better accuracy of the coarse compensation of the difference between frequencies FLO and Fc with respect to the case where gain G would always be at its maximum value.

During the first operating phase, that is, the preamble reception phase, each decrease of gain G from its maximum value to the unit value corresponds to the implementation of a phase of coarse compensation of the shift between frequencies FLO and Fc.

As an example, the control of gain G during the first operating phase is implemented by a circuit CTRL-ALGO of circuit NUM. For example, circuit CTRL-ALGO is configured to deliver a signal CTRL-G for controlling gain G. Preferably, circuit CTRL-ALGO is rated at frequency Clkcwr, and thus receives signal Clkcwr.

According to an embodiment, circuit CTRL-ALGO is configured to detect the beginning of the transmission of the preamble, that is, from what time signal RFin corresponds to a QPSK modulation by the known symbol S1.

For example, this detection is implemented based on signals sI2, sQ2, sI2−Q2, and sI2+Q2, while signal UP/DW is determined by circuit ALGO1 and gain G is at its maximum value.

More particularly, when signal RFin corresponds to the transmission of the preamble, and thus to the transmission of the known symbol S1, signals sI2 and sQ2 each are in a steady binary state for the entire duration of the preamble. Further, as long as gain G is at its maximum value and the state of bit UP/DW is determined by circuit ALGO1, between every two successive samplings at frequency Fcwr to obtain signals sI2, sQ2, sI2−Q2, and sI2+Q2, the value of phase shift θ is strongly modified, whereby, on the QPSK constellation, the position corresponding to signals I2(t) and Q2(t) is alternately shifted in a first direction and in a second direction with respect to symbol S1. According to preamble symbol S1, this appears as an alternation of the binary state of signal sI2+Q2 and/or sI2−Q2 at frequency Fcwr. If this alternation of the binary state of signal sI2+Q2 and/or sI2−Q2 is observed during a plurality of successive samplings at frequency Fcwr, for example, for 64 successive samplings, this means that the preamble is being received. For example, in the case where symbol S1 corresponds to pair I(t)='1' and Q(t)='1', that is, to symbol (1,1), signals sI2 and sQ2 are steady, for example, at binary state '1', while signal sI2−Q2 is switched at each sampling period at frequency Fcwr.

According to an embodiment, circuit LOOP comprises two digital filters F1 and F2. Filter F1 is a proportional-integral filter, filter F2 being an integrating filter. Filter F1 is configured to receive signal LOOP-IN. Second filter F2 is configured to receive the output signal of filter F1, and to deliver signal THETA. Preferably, filters F1 and F2 are rated at frequency Fcwr.

Figure 5:
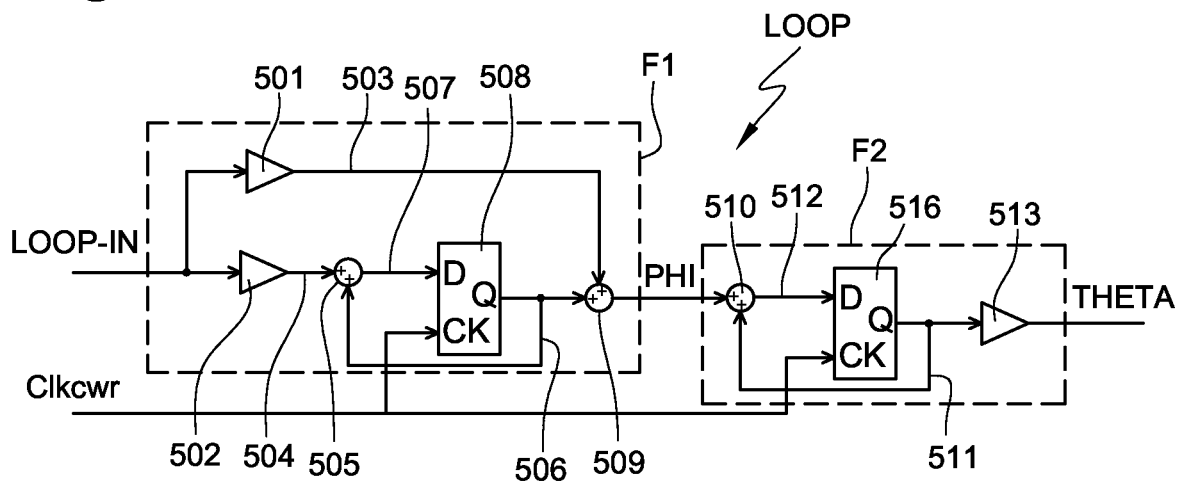
FIG. 5 shows an example of implementation of a circuit of the device of FIG. 2.

FIG. 5 illustrates in more detailed fashion an example of embodiment of circuit LOOP.

In FIG. 5, filters F1 and F2 are delimited by dotted lines.

In this example of embodiment, filter F1 comprises, for example, two gain stages 501 and 502, each receiving signal LOOP-IN and respectively delivering a signal 503 and a signal 504. As an example, the gain introduced by stage 501 is equal to 1, signal 503 then being equal to 1 time signal LOOP-IN. As an example, the gain introduced by stage 502 is equal to $1/16$, signal 504 then being equal to $1/16$ time signal LOOP-IN.

Filter F1 comprises an adder 505 configured to receive signal 504 and a signal 506, and to deliver a signal 507 corresponding to the sum of signals 504 and 506.

Signal 507 is delivered to the D data input of a register 508 of filter F1. Register 508, for example implemented from D flip-flops, is configured to store the state of digital signal 506 at each rising edge of the signal Clkcwr received by its CK input, and to deliver signal 506 on its output Q, signal 506 corresponding to the stored state of signal 507.

In practice, elements 502, 505, and 508 form the integrating branch of filter F1, element 501 forming the proportional branch of filter F1.

Filter F1 comprises an adder 509 configured to receive signals 503 and 506, and to deliver an output signal PHI of filter F1. In other words, adder 509 is configured to add the output signals of the proportional and integrating branches of filter F1, and to deliver the output signal PHI of filter F1.

Filter F2 is configured to receive the output signal PHI of filter F1, and to deliver signal THETA. More particularly, in the example of FIG. 5, filter F2 comprises an adder 510 configured to receive signal PHI and a signal 511 and to deliver a signal 512 corresponding to the sum of signals PHI and 511. Filter F2 further comprises a register 516, for example implemented by D flip-flops. Register 516 is configured to store the state of digital signal 512 at each rising edge of the signal Clkcwr received by its CK input, and to deliver signal 511 on its Q output, signal 511 corresponding to the stored state of signal 512. Signal THETA is obtained based on signal 511. For example, filter F2 comprises a gain stage 513 configured to receive signal 511 and to deliver signal THETA. As an example, the gain introduced by stage 513 is equal to $1/32$, signal THETA then being equal to $1/32$ time signal 511.

It will be within the abilities of those skilled in the art to provide other examples of implementation of filters F1 and F2, for example, by adding and/or by suppressing gain stages, and/or by modifying the values of the gains indicated hereabove as an example.

Referring again to FIG. 2, and as has already been previously indicated, device 2 comprises the VCO oscillator configured to deliver signals sFLO and sFLO+90 at frequency FLO. Oscillator VCO is controllable, that is, it is configured to receive a control signal CTRL-FLO having its value determining the value of frequency FLO.

According to an embodiment, device 2 comprises a circuit CTRL-COF configured to deliver signal CTRL-FLO. For example, when the reception of a preamble is detected, and as long as gain G has not reached the unit value for a first time, circuit CTRL-COF is configured to deliver a signal CTRL-FLO so that the value of frequency FLO is equal to an expected value of frequency Fc. Thus, when the reception of a preamble is detected, and as long as a first phase of coarse compensation of the shift is not over, the shift between frequencies Fc and FLO is only compensated for with the phase shift θ applied by circuit CORR.

According to an embodiment, during the reception of the preamble, at least at the end of the first implementation of a coarse compensation phase, preferably at the end of the implementation of each coarse compensation phase, circuit CTRL-COF is configured to determine the shift between frequency Fc and the current frequency FLO, to compare the shift thus determined with a threshold TH, and, according to the result of this comparison, to update signal CTRL-FLO, and thus the current value of frequency FLO. According to an embodiment, circuit CTRL-COF is configured to update signal CTRL-FLO based on an output signal of circuit LOOP, for example based on the signal PHI available at the output of filter F1 at the end of the implementation of this coarse compensation phase.

According to an embodiment, during a preamble reception phase, when gain G reaches the unit value, that is, at the end of a corresponding phase of coarse compensation of the difference between frequency Fc and the current frequency FLO delivered by the VCO circuit, if this frequency shift is greater than threshold TH, for example, in the order of 10 MHz, circuit CTRL-COF modifies the value of signal CTRL-FLO, to decrease the difference between frequency Fc and frequency FLO. The fact of decreasing the difference between frequencies Fc and FLO enables signal THETA to be less noisy. As an example, signal CTRL-FLO is modified based on signal PHI averaged over a plurality of cycles of signal Clkcwr, for example, over 16 or 32 cycles of signal Clkcwr. For example, signal CTRL-FLO is modified to receive this averaged value of signal PHI.

The verification, at the end of the implementation of a coarse compensation phase, that the shift between frequency Fc and the current frequency FLO delivered by circuit VCO is smaller or greater than threshold TH is implemented, for example, by circuit CTRL-CFO. For example, this verification is performed by verifying that an output signal of circuit LOOP representative of the shift between frequencies FLO and Fe, for example, signal PHI, is respectively smaller or greater than a threshold determined by threshold TH. Circuit CTRL-COF then receives, for example, signal PHI and a binary signal G1 having its binary sate indicating whether gain G has reached or not the unit value during a phase of reception of the preamble. As an example, signal G1 is delivered by circuit CTRL-ALGO.

Further, during the preamble reception phase, when the value of frequency FLO is modified at the end of the implementation of a coarse compensation phase, a new coarse compensation phase is implemented to take into account the new current value of frequency FLO. During this new coarse compensation phase, gain G is periodically decreased from its maximum value to the unit value. As an example, the implementation of a new coarse compensation phase is controlled by a resetting of gain G to its maximum value. For example, the resetting of gain G to its maximum value is controlled by circuit CTRL-CFO, for example, by a binary signal Gmax, for example, by a switching of signal Gmax from a first binary state to a second binary state.

According to an embodiment, conversely, during a phase of reception of the preamble, when gain G reaches the unit value at the end of a phase of coarse compensation of the shift between frequencies Fc and FLO, if this shift is smaller than threshold TH, signal CTRL-FLO is held at its current value and gain G is then held at its unit value. In other words, the current value of frequency FLO is not modified, and there is no new implementation of a coarse compensation phase. For example, the holding of gain G at its unit value is controlled by circuit CTRL-CFO. As an example, this holding of gain G at its unit value is controlled by the binary signal Gmax delivered by circuit CTRL-COF to circuit CTRL-G, for example, by holding binary signal Gmax in its first binary state.

Figure 6:
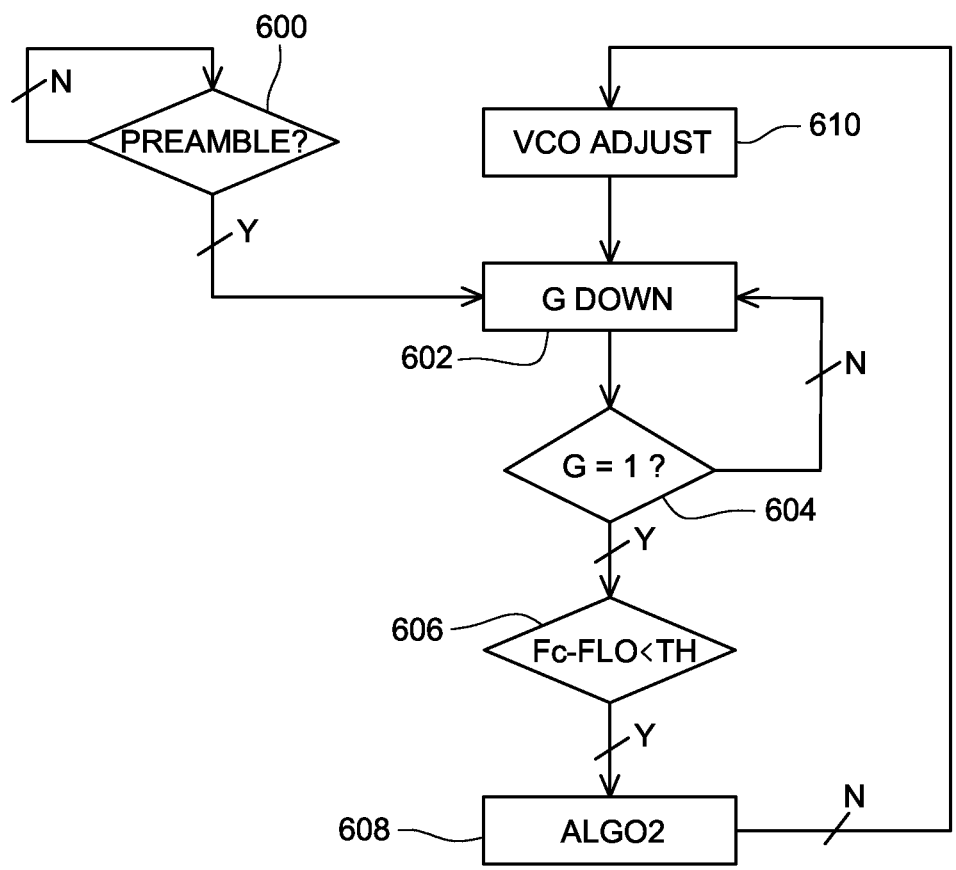
FIG. 6 is a flowchart illustrating an embodiment of a method implemented by device 2.

FIG. 6 is a flowchart illustrating the operation of device 2 according to an embodiment.

At a step 600 (block "Preamble?"), device 2, for example, its circuit CTRL-ALGO, verifies whether it is receiving a preamble corresponding to symbol S1. As an example, and as previously described in relation with FIG. 2, this verification is implemented while signal UP/DW is determined by circuit ALGO1 and gain G is at a maximum value, by observing over a plurality of cycles of signal Clkcwr whether signals sI2 and SQ2 correspond to symbol S1, and whether signal sI2+Q2 and/or signal sI2−Q2 switch at each cycle of signal Clkcwr.

If the reception of the preamble is detected (output Y of block 600), a first implementation of the coarse correction phase has started, and the method carries on at a step 602 (block "G DOWN"). Otherwise (output N of block 600), device 2 remains at step 600.

At step 602, device 2, for example, its circuit CTRL-ALGO, controls a decrease in gain G, and then waits for a given number of cycles of signal Clkcwr. This given number of cycles corresponds to the period of periodic decrease of gain G during the coarse correction phase where signal UP/DW is determined by circuit ALGO1. The method carries on at a step 604 (block "G=1?").

At step 604, device 2, for example, its circuit CTRL-ALGO, verifies whether gain G has reached the unit value, and thus whether a corresponding coarse correction phase has ended. If such is the case (output Y of block 604), the method carries on at a step 606 (block "Fc-FLO<TH"), otherwise (output N of block 604) the method carries on at step 602 of decrease of gain G.

At step 606, device 2, for example, its circuit CTRL-CFO, verifies, at the time when gain G reaches the unit value during the reception of the preamble, that is, at the end of the corresponding coarse correction phase, whether the difference between frequency Fc and the current frequency FLO is smaller than threshold TH. As an example, this verification is implemented as previously described in relation with FIG. 2, by comparison with a threshold of an output signal of circuit LOOP, for example, by comparing signal PHI with this threshold.

If this difference between frequencies Fc and FLO is smaller than threshold TH (output Y of block 606), the current value of frequency FLO is not updated, gain G is held at its unit value, and there is no implementation of a new coarse correction phase. The method then carries on at a step 608 (block "ALGO2").

However, if this difference between frequency Fc and the current frequency FLO is greater than threshold TH (output N of block 606), the method carries on at a step 610 (block "VCO ADJUST").

At step 610, the value of signal CTRL-FLO is updated based on signal PHI. Further, gain G is reset to its maximum value, for example, by means of signal Gmax. The resetting of gain G to its maximum value causes the implementation of a new coarse correction phase. After a delay corresponding to the period at which gain G is decreased, the method carries on at step 602.

According to an embodiment, from step 608, gain G is held at its unit value, for example, by signal Gmax and, further, signal UP/DW is determined by a circuit ALGO2 of circuit NUM, and no longer by circuit ALGO1 (see FIG. 2). Further, signal CTRL-FLO is held at its current value or, in other words, frequency FLO is held at its current value.

Referring again to FIG. 2, as has just been indicated hereabove, according to an embodiment, circuit NUM further comprises a circuit ALGO2.

According to an embodiment, circuit ALGO2 is configured, at least during a phase of data reception via signal RFin, to determine phase shift θ to more finely compensate, continuously, the difference between frequency Fc and the current frequency FLO. In other words, circuit ALGO2 is configured to determine the state of signal UP/DW when the implementation of the coarse compensation phases is over.

According to an embodiment, during a second operating phase, starting at step 608 (FIG. 6), circuit NUM, and more particularly its circuit ALGO2, are configured to determine the state of signal UP/DW not only based on signals sI2−Q2 and sI2+Q2, but also according to signals sI2 and sQ2. Indeed, during this second operating phase, once the transmission of the preamble is over, signal RFin is QPSK modulated based on a symbol updated at frequency Fs, and no longer based on a single previously-known constant symbol S1 of device 2. During this second operating phase, circuit NUM is configured to estimate which of symbols (0,0), (1,0), (0,1) and (1,1) of the QPSK constellation signals I1(t) and Q1(t) corresponds to, based on signals sI2 and sQ2. In other words, circuit NUM is configured to determine, during the last sampling at frequency Fcwr implemented by circuit CORR, which symbol of the QPSK constellation signals I1(t) and Q1(t) correspond to. Still in other words, circuit NUM is configured to determine, during the last sampling at the frequency Fcwr implemented by circuit CORR, which symbol of the QPSK constellation signals I2(t) and Q2(t) correspond to.

Further, according to an embodiment, to determine the state of signal UP/DW during the second operating phase, circuit NUM, and more exactly its circuit ALGO2, is configured to set bit UP/DW to its first binary state when, on the QPSK constellation, a position corresponding to signals Q2(t) and I2(t) is shifted in a first direction, for example, the counterclockwise direction, with respect to the symbol estimated based on signals sQ2(t) and sI2(t), and to its second binary state when, on the QPSK constellation, a position corresponding to signals Q2(t) and I2(t) is shifted in a second direction, for example, the clockwise direction, with respect to the symbol estimated based on signals sQ2(t) and sI2(t). It is here understood that the position corresponding to signals I2(t) and Q2(t) is taken at the time of the sampling at frequency Fcwr.

According to an embodiment, similarly to what is implemented by circuit ALGO1, the direction of the shift, on the QPSK constellation, of the position corresponding to signals I2(t) and Q2(t) with respect to the symbol estimated based on signals sI2 and sQ2, is determined based on signals sI2+Q2 and sI2−Q2. It is here understood that the signals sI2 and sQ2 based on which the QPSK symbol is estimated, and the signals sI2+Q2 and sI2−Q2 based on which the shift direction with respect to the estimated symbol is estimated correspond to a same time of sampling at frequency Fcwr. Preferably, circuit ALGO2 is a purely combinational circuit.

Figure 7:
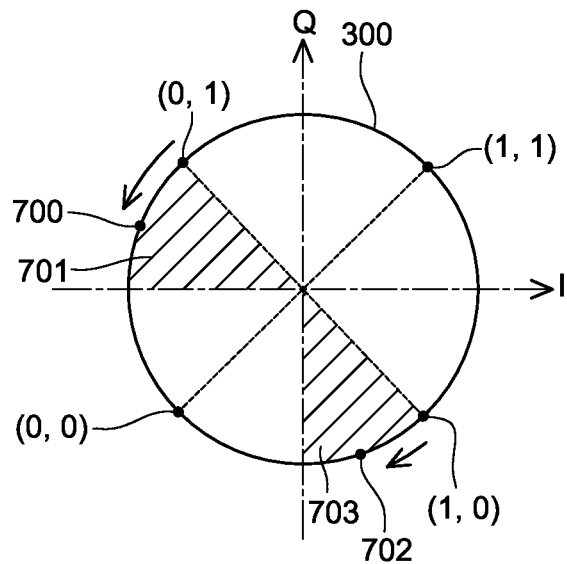
FIG. 7 shows a QPSK constellation diagram and illustrates an implementation mode of an algorithm.

FIG. 7 illustrates an embodiment of the determination, during the second operating phase, of the state of bit UP/DW, based on signals sI2+Q2 and sI2−Q2, this determination of bit UP/DW being for example implemented by the circuit ALGO2 of circuit NUM.

According to example illustrated in FIG. 7, at the time of the sampling to obtain signals sI2, sQ2, sI2+Q2, and sI2−Q2, signals I2(t) and Q2(t) correspond to a position 700 on the QPSK constellation. The signals sI2 and sQ2 obtained during this sampling are at binary states, for example, respectively '0' and '1', which enable to estimate that the symbol received during the sampling is symbol (0, 1). Further, the signal sI2+Q2 obtained during this sampling is in a binary state, for example '0', indicating that the sum of signals I2(t) and Q2(t) is negative, and signal sI2−Q2 is in a binary state, for example '0', indicating that the difference of signals I2(t) and Q2(t) is negative. Thus, even without exactly knowing the location of position 700 with respect to symbol (0, 1), signals sI2+Q2 and sI2−Q2 enable to know that position 700 is located in an area 701 (hatched in FIG. 7), and thus that position 700 is shifted counterclockwise with respect to symbol (0, 1). In this example, bit UP/DW is set to its first binary state, for example, '1'.

According to example illustrated in FIG. 7, at the time of the sampling, signals I2(t) and Q2(t) correspond to a position 702 on the QPSK constellation. The signals sI2 and sQ2 obtained during this sampling are at binary states, for example, respectively '1' and '0', which enable to estimate that the symbol received during the sampling is symbol (1, 0). Further, the signal sI2+Q2 obtained during this sampling is in a binary state, for example '0', indicating that the sum of signals I2(t) and Q2(t) is negative, and signal sI2−Q2 is in a binary state, for example '1', indicating that the difference of signals I2(t) and Q2(t) is positive. Thus, even without exactly knowing the location of position 702 with respect to symbol (1, 0), signals sI2+Q2 and sI2−Q2 enable to know that position 702 is located in an area 703 (hatched in FIG. 7), and thus that position 702 is shifted clockwise with respect to symbol (1, 0). In this example, bit UP/DW is set to its second binary state, for example, '0'.

Signal UP/DW enables, as in the algorithm described in relation with FIG. 3, to determine whether the phase shift θ applied to signals I1(t) and Q1(t) should be decreased, or increased, to compensate for the shift between frequencies Fc and FLO. Due to the fact that gain G is held at its unit value during the second operating phase, the shift compensation between frequencies FLO and Fc is then more accurate than during the coarse compensation phases implemented during the first operating phase.

It will be within the abilities of those skilled in the art to determine, based on the two examples described hereabove in relation with FIG. 7, for each of the symbols of the QPSK constellation, which combination of signals sI2 and sQ2 corresponds to which estimated symbol and, further, once a symbol has been estimated, which combination of signals sI2+Q2 and sI2−Q2 enables to determine that the shifting direction is the clockwise direction, or the counterclockwise direction.

Figure 8:
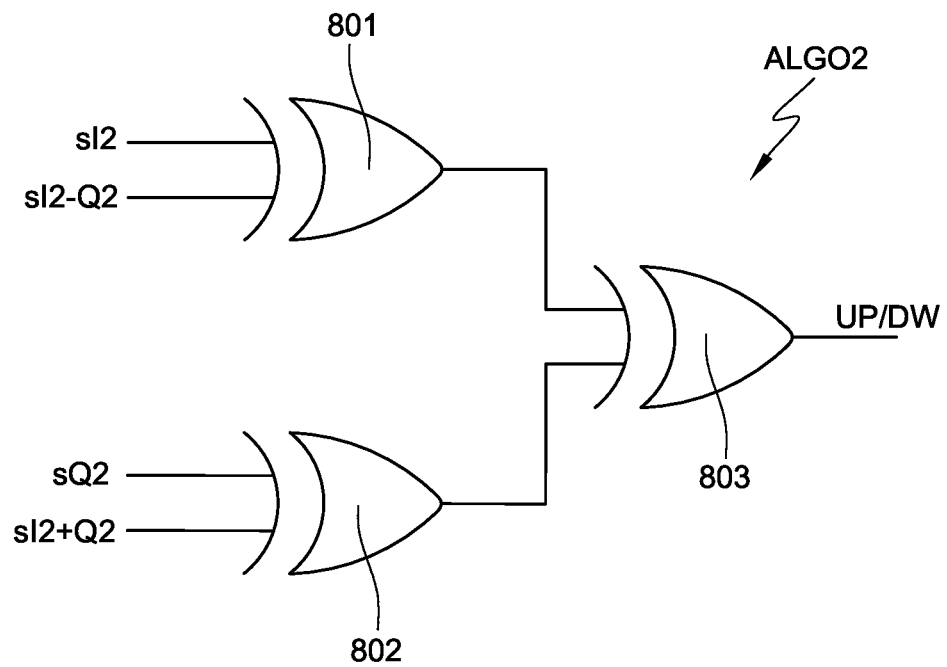
FIG. 8 shows an example of implementation of a circuit for the execution of the algorithm of FIG. 7.

FIG. 8 shows an example of an embodiment of the circuit ALGO2 implementing the algorithm described in relation with FIG. 7.

In the example of FIG. 8, signal sI2+Q2 is in binary state '1', respectively '0', when the sum of signals I2(t) and Q2(t) is positive, respectively negative, signal sI2−Q2 is in binary state '1', respectively '0', when the difference of signals I2(t) and Q2(t) is positive, respectively negative, signal sI2 is in binary state '1', respectively '0', when signal I2(t) is positive, respectively negative, signal sQ2 is in binary state '1', respectively '0', when signal Q2(t) is positive, respectively negative, and bit UP/DW is placed in binary state '1', respectively '0', when the shift is in the counterclockwise direction, respectively in the clockwise direction.

In this example, circuit ALGO2 comprises three XOR gates 801, 802, and 803.

Gate 801 is configured to receive the two signals sI2 and sI2−Q2, gate 802 being configured to receive signals sQ2 and sI2+Q2. Gate 803 is configured to receive the output signal of gate 801 and the output signal of gate 802, and to deliver bit UP/DW.

It will be within the abilities of those skilled in the art, based on the functional description made hereabove of circuit ALGO2, to provide other implementations of this circuit ALGO2.

Referring again to FIG. 2, device 2, for example, its circuit NUM, comprises a circuit configured to detect the passage from the first operating phase, when signal UP/DW is determined by circuit ALGO1 and gain G periodically decreases from its maximum value to the unit value, to the second operating phase, when signal UP/DW is determined by circuit ALGO2 and gain G is held at the unit value. This circuit is for example configured to determine the passage from the first operating phase to the second operating phase based on signals G1 and Gmax. For example, when a switching of signal G1 indicates that gain G has just reached the unit value, and that, as a response to this switching of signal G1, signal Gmax does not switch, or, in other words, controls the holding of gain G at the unit value, this means that the first operating phase is over and that the second operating phase starts.

As an example, the circuit for detecting the passage from the first operating phase to the second operating phase is circuit CTRL-ALGO, already configured to control the periodic decreases of gain G down to its unit value.

Further, according to an embodiment illustrated in FIG. 2, the two circuits ALGO1 and ALGO2 operate in parallel, the signal UP/DW delivered to gain stage G being the output signal of circuit ALGO1 during the first operating phase, and the output signal of circuit ALGO2 during the second operating phase. Circuit NUM then comprises a selection circuit ("Multiplexer") MUX configured to receive the output bit of circuit ALGO1, the output bit of circuit ALGO2, and a control signal SEL, and to deliver bit UP/DW on its output. More particularly, circuit MUX is configured so that bit UP/DW corresponds to the output bit of circuit ALGO1 when signal SEL is in a first binary state, and to the output bit of circuit ALGO2 when signal SEL is in a second binary state. Signal SEL is delivered by the circuit configured to detect the passage from the first operating phase to the second operating phase, that is, by circuit CRTL-ALGO in the example of FIG. 2.

Figure 9:
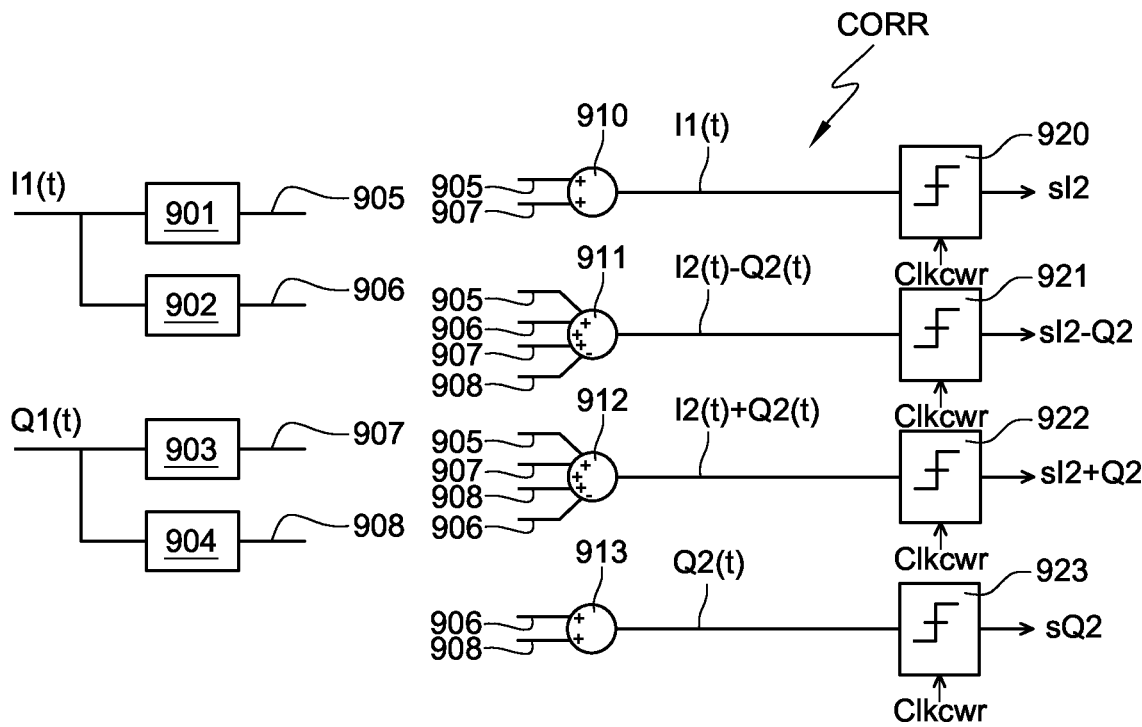
FIG. 9 shows an embodiment of a circuit of the device of FIG. 2.

FIG. 9 illustrates an embodiment of the circuit CORR of device 2.

In the embodiment of FIG. 9, signals $I1(t)$ and $Q1(t)$ are signal referenced with respect to ground or, in other words, are not differential signals.

Circuit CORR comprises four circuits 901, 902, 903, and 904. Circuit 901 is configured to receive signal $I1(t)$ and multiply it by a cosine having an argument equal to phase shift $\theta$, that is, by $\cos(\theta)$, and to deliver a signal 905 corresponding to the result of this multiplication. Circuit 901 is configured to receive signal $I1(t)$ and multiply it by a sine having an argument equal to phase shift $\theta$, that is, by $\sin(\theta)$, and to deliver a signal 906 corresponding to the result of this multiplication. Circuit 903 is configured to receive signal $Q1(t)$ and multiply it by a cosine having an argument $\theta$, and to deliver a signal 907 corresponding to the result of this multiplication. Circuit 904 is configured to receive signal $Q1(t)$ and multiply it by a cosine having an argument $\theta$, and to deliver a signal 908 corresponding to the result of this multiplication.

Circuit CORR further comprises four circuits 910, 911, 912, and 913. Circuit 910 is configured to receive signals 905 and 907, and to deliver the signal $I2(t)$ corresponding to the sum of signals 905 and 907. Circuit 911 is configured to receive signals 905, 906, 907, and 908, and to deliver a signal $I2(t)-Q2(t)$ corresponding to the sum of signals 905, 906, and 907 from which signal 908 is subtracted. Circuit 912 is configured to receive signals 905, 906, 907, and 908, and to deliver the signal $I2(t)+Q2(t)$ corresponding to the sum of signals 905, 907, and 908 from which signal 906 is subtracted. Circuit 913 is configured to receive signals 906 and 908, and to deliver the signal $Q2(t)$ corresponding to signal 908 from which signal 906 is subtracted. In practice, signal $I2(t)-Q2(t)$ corresponds to signal $I2(t)$ from which signal $Q2(t)$ is subtracted, signal $I2(t)+Q2(t)$ corresponding to the sum of signals $I2(t)$ and $Q2(t)$. To avoid overloading the drawing, the connections between the outputs of circuits 901 to 904 and the inputs of circuits 910 to 913 have not been drawn in FIG. 9.

Circuit CORR further comprises four circuits 920, 921, 922, and 923. Circuit 920 is configured to receive signal $I2(t)$ and signal Clkcwr, and to deliver signal sI2, circuit 921 is configured to receive signal $I2(t)-Q2(t)$ and signal Clkcwr, and to deliver signal sI2−Q2. Circuit 922 is configured to receive signal $I2(t)+Q2(t)$ and signal Clkcwr, and to deliver signal sI2+Q2. Circuit 923 is configured to receive signal $Q2(t)$ and signal Clkcwr, and to deliver signal sQ2.

As an example, each circuit 920, 921, 922, and 923 is configured, at each active edge of signal Clkcwr, to deliver an output bit in a first binary state, for example '1', when the signal $I2(t)$, $Q2(t)$, $I2(t)-Q2(t)$, or $I2(t)+Q2(t)$ that it receives is positive at the time of the active edge of signal Clkcwr, to deliver an output bit in a second binary state, for example, '0', when this signal is negative at the time of the active edge of signal Clkcwr, and to hold the state of its output bit between every two successive active edges of signal Clkcwr. In other words, each circuit 920, 921, 922, and 923 implements a sampling, or quantization, over one bit of the signal, respectively $I2(t)$, $I2(t)-Q2(t)$, $I2(t)+Q2(t)$, or $Q2(t)$ that it receives.

An advantage of the circuit CORR of FIG. 9 is that each path between an input configured to receive signal $I1(t)$ or $Q1(t)$ and an output configured to deliver one of signals sI2, sQ2, sI2+Q2, and sI2−Q2 crosses the same number of circuits, whereby circuit CORR introduces no phase shift between signals sI2, sQ2, sI2+Q2, and sI2−Q2.

The implementation of circuits 901 to 904, 910 to 913, and 920 to 924 has not been detailed and is within the abilities of those skilled in the art based on the functional description made hereabove in relation with FIG. 9.

Figure 10:
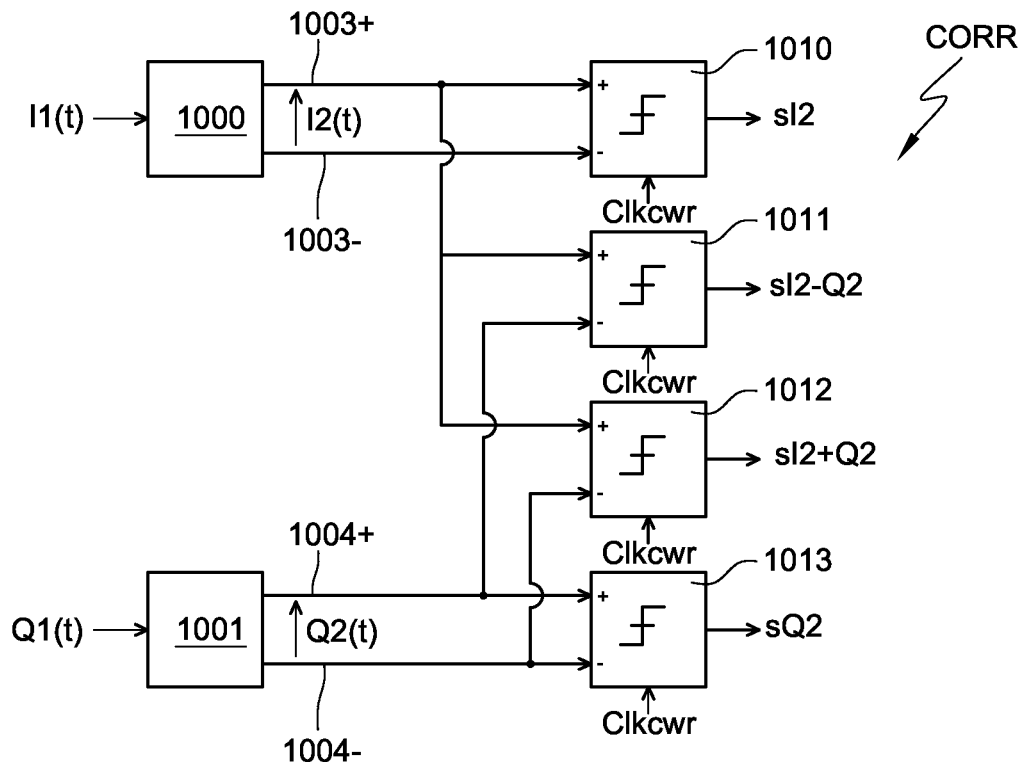
FIG. 10 shows another embodiment of a circuit of the device of FIG. 2.

FIG. 10 illustrates another embodiment of the circuit CORR of device 2. In this embodiment, the signals $I2(t)$ and $Q2(t)$ generated inside of circuit CORR are differential signals, each propagated on an assembly of a so-called non-inverting line and of a so-called inverting line, signal $I2(t)$, respectively $Q2(t)$, then corresponding to the voltage taken between the two lines and referenced to the inverting line.

More particularly, in FIG. 10, circuit CORR comprises a circuit 1000 and a circuit 1001. Circuit 1000 is configured to receive signal $I1(t)$, which signal $I1(t)$ may be a differential signal, and to deliver differential signal $I2(t)$ between a non-inverting line 1003+ and an inverting line 1003−. Circuit 1001 is configured to receive signal $Q1(t)$, which signal $Q1(t)$ may be a differential signal, and to deliver differential signal $Q2(t)$ between a non-inverting line 1004+ and an inverting line 1004−. Preferably, circuits 1000 and 1001 are configured to have an identical output common mode. The implementation of circuits 1000 and 1001 is within the abilities of those skilled in the art.

Circuit CORR further comprises four circuits 1010, 1011, 1012, and 1013. Each circuit 1010, 1011, 1012, and 1013 is configured to receive signal Clkcwr. Circuit 1010 is further configured to receive lines 1003+ and 1003− on respective non-inverting (+) and inverting (−) inputs, and to deliver signal sI2. Circuit 1011 is further configured to receive lines 1003+ and 1004+ on respective non-inverting (+) and inverting (−) inputs, and to deliver signal sI2−Q2. Circuit 1012 is further configured to receive lines 1003+ and 1004− on respective non-inverting (+) and inverting (−) inputs, and to deliver signal sI2+Q2. Circuit 1013 is further configured to receive lines 1004+ and 1004− on respective non-inverting (+) and inverting (−) inputs, and to deliver signal sQ2. In other words, each circuit 1010, 1011, 1012, and 1013 implements a sampling, or quantization, over one bit of the signal, respectively $I2(t)$, $I2(t)-Q2(t)$, $I2(t)+Q2(t)$, or $Q2(t)$ that it receives.

The implementation of circuits 1010, 1011, 1012 and 1013 is within the abilities of those skilled in the art.

As an example, each circuit 1010, 1011, 1012, and 1013 is configured, at each active edge of signal Clkcwr, to deliver an output bit in a first binary state, for example, '1', when the differential voltage between its non-inverting (+) and inverting (−) inputs is positive at the time of the active edge of signal Clkcwr, to deliver an output bit in a second binary state, for example, '0', when the differential voltage between its non-inverting and inverting inputs is negative at the time of the active edge of signal Clkcwr, and to hold the state of its output bit between two successive active edges of signal Clkcwr.

According to an alternative embodiment, not illustrated, of the circuits CORR of FIGS. 9 and 10, circuits 920 and 923, respectively 1010 and 1013, do not receive signal Clkcwr, but a signal at data frequency Fs which is an integer multiple of frequency Clkcwr. In this case, it is still considered that circuits 920 and 923, respectively 1010 and 1013, sample signals I2(t) and Q2(t) at the frequency Fcwr of signal Clkcwr. In such a variant, preferably, circuits 920 and 923, respectively 1010 and 1013, are shared between circuit CORR and the circuit for recovering data frequency Fs.

Various embodiments and variants have been described. Those skilled in the art will understand that certain features of these various embodiments and variants may be combined, and other variants will occur to those skilled in the art. In particular, once the first operating phase during which signal UP/DW is determined by circuit ALGO1 is over, the second operating phase may be implemented differently from what has been described hereabove.

Further, in the above-described embodiments, during the first operating phase, at each end of a coarse compensation phase, the difference between frequency Fc and the current frequency FLO is determined and then compared with threshold TH and, if this determined difference is greater than threshold TH, the value of frequency FLO is modified and a new coarse correction phase is implemented by resetting gain G to its maximum value. In alternative embodiments, not illustrated, this comparison is not implemented, and the first operating phase comprises at least one implementation of step 610, the number of implementations of step 610 being constant. In other words, in these variants, the number of implementations of the coarse compensation phase is constant and at least equal to two, and at each implementation of a coarse compensation phase except for the last one, frequency FLO is updated. The first operating phase ends and the second operating phase starts at the end of the last implementation of the coarse compensation phase.

Further, although this has not been previously described, the duration of the transmission of the preamble by transmitter Tx may be fixed and selected to be sufficiently long to ascertain that, at the end of the preamble, the shift between frequencies Fc and FLO has sufficiently been compensated for. As a variant, the transmission duration may be variable and the end of the transmission of the preamble may be requested by receiver Rx from transmitter Tx, once receiver Rx has sufficiently compensated for the shift between frequencies Fc and FLO.

Finally, the practical implementation of the described embodiments and variations is within the abilities of those skilled in the art based on the functional indications given hereabove.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
  a first circuit;
  a second circuit; and
  a third circuit,
  wherein the first circuit is configured to:
    receive a first signal,
    a second signal,
    a third signal, the third signal being representative of a phase shift,
    generate a fourth signal and a fifth signal by applying the phase shift respectively to the first signal and to the second signal, and
    deliver a sixth signal corresponding to a sampling over one bit of the fourth signal, a seventh signal corresponding to a sampling over one bit of the fifth signal, an eighth signal corresponding to a sampling over one bit of a difference between the fourth and fifth signals, and a ninth signal corresponding to a sampling over one bit of a sum between the fourth and fifth signals,
  wherein the second circuit is configured to:
    receive the sixth, seventh, eighth, and ninth signals,
    determine, during a first phase where the first and second signals are representative of a first known symbol of a QPSK constellation, a state of a first bit from among a first state and a second state based on the eighth and ninth signals;
    deliver a digital signal corresponding to a multiplication of the first bit by a gain, and
    periodically decrease, during the first phase, the gain down to a unit value, and
  wherein the third circuit is configured to determine the third signal based on the digital signal.

2. The device according to claim 1, wherein the second circuit comprises a fourth circuit configured to, during the first phase:
  set the first bit to the first state when a position on the QPSK constellation corresponding to the fourth and fifth signals is shifted in a first direction with respect to the first symbol, and
  set the first bit to the second state when, on the QPSK constellation, the position is shifted in a second direction with respect to the first symbol.

3. The device according to claim 2, wherein the fourth circuit is configured to determine a direction of the shift based on the eighth and ninth signals.

4. The device according to claim 3, wherein the fourth circuit is configured to determine a direction of the shift based on only the eighth and ninth signals.

5. The device according to claim 3, wherein the fourth circuit is a two-state state machine configured to be rated at a frequency of a sampling of the sum and of the difference of the fourth and fifth signals.

6. The device according to claim 1, wherein the third circuit comprises a first digital filter followed by a second digital filter, wherein the first filter is configured to receive the digital signal, and wherein the second filter is configured to receive an output signal of the first filter and to deliver the third signal.

7. The device according to claim 6, wherein the first and second filters are configured to be rated at a frequency of a sampling of the sum and of the difference of the fourth and fifth signals.

8. The device according to claim 1, further comprising an oscillator configured to deliver a tenth signal and an eleventh signal at a first frequency determined by a control signal, wherein the eleventh signal is phase-shifted by 90° with respect to the tenth signal, and wherein a control circuit is configured to deliver the control signal.

9. The device according to claim 8, wherein, during the first phase, the control circuit is configured, at least when the gain reaches the unit value for a first time, to:
- determine a difference between the first frequency and a second frequency,
- compare the determined difference with a threshold,
- update the control signal and control a resetting of the gain to a maximum value when the comparison indicates that the difference is greater than the threshold, and
- hold the control signal at its current value and control the holding of the gain at the unit value when the comparison indicates that the difference is smaller than the threshold.

10. The device according to claim 9, wherein the difference between the first frequency and the second frequency is determined based on a signal delivered by the third circuit.

11. The device according to claim 8, further comprising:
- a first frequency mixer configured to receive the tenth signal and a QPSK-modulated radio frequency signal; and
- a second frequency mixer configured to receive the eleventh signal and the QPSK-modulated radio frequency signal,
- wherein the first mixer is configured to deliver the first signal and the second mixer is configured to deliver the second signal.

12. The device according to claim 11, wherein the first circuit is configured to sample the fourth and fifth signals, the sum of the fourth and fifth signals, and the difference of the fourth and fifth signals at a frequency smaller than a data frequency of the QPSK-modulated radio frequency signal.

13. The device according to claim 1, wherein, during a second phase, the second circuit is configured to determine the state of the first bit based on the six, seventh, eighth, and ninth signals.

14. The device according to claim 13, wherein the second circuit comprises a gain circuit configured to determine a passage from the first phase to the second phase.

15. The device according to claim 13, wherein the second circuit comprises a fifth circuit configured to, during the second phase:
- estimate which of four symbols in a constellation correspond to the first and second signals, based on the sixth and seventh signals,
- set the first bit to the first state when, on the constellation, a position corresponding to the fourth and fifth signals is shifted in a first direction with respect to the estimated symbol, and
- set the first bit to the second state when, on the constellation, the position is shifted in a second direction with respect to the estimated symbol.

16. The device according to claim 15, wherein the fifth circuit is configured to determine a shifting direction based on the eighth and ninth signals.

17. A QPSK demodulator comprising:
the device according to claim 1.

18. A method comprising:
- receiving, by a first circuit, a third signal, the third signal being representative of a phase shift;
- generating, by the first circuit, a fourth signal and a fifth signal by applying the phase shift respectively to a first signal and to a second signal;
- providing, by the first circuit, a sixth signal corresponding to a sampling over one bit of the fourth signal, a seventh signal corresponding to a sampling over one bit of the fifth signal, an eighth signal corresponding to a sampling over one bit of a difference between the fourth and fifth signals, a ninth signal corresponding to a sampling over one bit of a sum between the fourth and fifth signals;
- receiving, by a second circuit, the sixth, seventh, eighth, and ninth signals,
- determining, by the second circuit, during a first phase where the first and second signals are representative of a first known symbol of a QPSK constellation, a state of a first bit from among a first state and a second state based on the eighth and ninth signals;
- providing, by the second circuit, a digital signal corresponding to a multiplication of the first bit by a gain; and
- periodically decreasing, during the first phase, the gain down to a unit value.

19. The method according to claim 18, further comprising determining, by a third circuit, the third signal based on the digital signal.

20. The method according to claim 18, further comprising, during the first phase:
- determining, by a control circuit, at least when the gain reaches the unit value for a first time, a difference between a first frequency and a second frequency;
- comparing, by the control circuit, the determined difference with a threshold;
- updating the control signal and controlling a resetting of the gain to a maximum value when the comparison indicates that the difference is greater than the threshold; and
- holding the control signal at its current value and controlling the holding of the gain at the unit value when the comparison indicates that the difference is smaller than the threshold.

* * * * *